(12) United States Patent
Büker

(10) Patent No.: US 11,668,341 B2
(45) Date of Patent: Jun. 6, 2023

(54) BEARING UNIT FOR FASTENING A STEERING COLUMN IN A VEHICLE

(71) Applicant: ZF Automotive Germany GmbH, Alfdorf (DE)

(72) Inventor: Richard Büker, Willich (DE)

(73) Assignee: ZF Automotive Germany GmbH, Alfdorf (DE)

( * ) Notice: Subject to any disclaimer, the term of this patent is extended or adjusted under 35 U.S.C. 154(b) by 14 days.

(21) Appl. No.: 17/411,766

(22) Filed: Aug. 25, 2021

(65) Prior Publication Data
US 2022/0065287 A1    Mar. 3, 2022

(30) Foreign Application Priority Data

Aug. 27, 2020    (DE) .......................... 102020210843.9

(51) Int. Cl.
| F16C 17/02 | (2006.01) |
| B62D 1/184 | (2006.01) |
| B62D 1/185 | (2006.01) |
| B62D 1/187 | (2006.01) |

(52) U.S. Cl.
CPC .............. *F16C 17/02* (2013.01); *B62D 1/184* (2013.01); *B62D 1/185* (2013.01); *B62D 1/187* (2013.01)

(58) Field of Classification Search
CPC ......... F16C 17/02; B62D 1/184; B62D 1/185; B62D 1/187
See application file for complete search history.

(56) References Cited

U.S. PATENT DOCUMENTS

| 9,446,781 | B2 * | 9/2016 | Tanaka | B62D 1/187 |
| 9,718,490 | B2 * | 8/2017 | Tanaka | B62D 1/184 |
| 2014/0000325 | A1 * | 1/2014 | Buzzard | B62D 1/184 70/183 |
| 2015/0375770 | A1 * | 12/2015 | Buzzard | B62D 1/184 74/495 |
| 2019/0111962 | A1 * | 4/2019 | Kurokawa | B62D 1/184 |

FOREIGN PATENT DOCUMENTS

| CN | 101883704 A | * | 11/2010 | ............. B62D 1/184 |
| CN | 101583529 B | * | 11/2012 | ............. B62D 1/184 |
| CN | 110636966 A | * | 12/2019 | ............. B62D 1/184 |
| EP | 3023317 A1 | * | 5/2016 | ............. B62D 1/184 |
| EP | 3115276 A2 | * | 1/2017 | ............. B62D 1/184 |
| GB | 2191273 A | * | 12/1987 | ............. B62D 1/184 |
| WO | WO-2010122958 A1 | * | 10/2010 | ............. B62D 1/184 |
| WO | WO-2017175825 A1 | * | 10/2017 | ............. B62D 1/184 |
| WO | WO-2020148198 A1 | * | 7/2020 | ............. B62D 1/184 |

\* cited by examiner

*Primary Examiner* — Drew J Brown
(74) *Attorney, Agent, or Firm* — Kristin L. Murphy

(57) ABSTRACT

The disclosure relates to a bearing unit for fastening a steering column in a vehicle. The bearing unit has a bracket unit that can be fixed to the vehicle, a bearing sleeve and a locking mechanism for optionally fixing the bearing sleeve on the bracket unit and for optionally releasing a relative movement of the bearing sleeve with respect to the bracket unit. The locking mechanism has a first eccentric which is coupled to a first counterpart eccentric unit in order to fix the bearing sleeve on the bracket unit via a first form-fit connection acting in a first direction and a second form-fit connection acting in a second direction.

18 Claims, 7 Drawing Sheets

BEARING UNIT FOR FASTENING A STEERING COLUMN IN A VEHICLE

CROSS-REFERENCE TO RELATED APPLICATION

This application claims priority to German Patent Application No. 102020210843.9 filed Aug. 27, 2020, the disclosure of which is incorporated herein by reference in its entirety.

TECHNICAL FIELD

The disclosure relates to a bearing unit for fastening a steering column in a vehicle, with a bracket unit that can be mounted fixedly on the vehicle, a bearing sleeve that extends along a bearing sleeve center axis and is designed to receive the steering column, and a locking mechanism for optionally fixing the bearing sleeve on the bracket unit and for optionally releasing a relative movement of the bearing sleeve with respect to the bracket unit.

BACKGROUND

Bearing units are known in the art.

Bearing units are used to arrange a steering column and a steering wheel connected thereto in an adjustable manner within a vehicle. Thus, a position of the steering wheel can be adapted to a driver.

In particular, in this context a longitudinal adjustment is known, in which the steering wheel and the steering column can be adjusted along a central axis of the steering column which usually coincides with a bearing sleeve center axis (known as reach adjustment or telescope adjustment). In addition, the height of the steering wheel can be adjusted by displacing the bearing sleeve substantially in a vertical direction with respect to a bracket unit (known as rake adjustment or tilt adjustment).

With such bearing units, a simple and smooth adjustability often conflicts with a mechanically fixed locking of the steering column. The steering column must remain firmly locked, particularly in accident situations.

SUMMARY

What is needed is an improved bearing unit of the type mentioned at the outset that can ensure both simple and smooth adjustability of the steering column and reliable locking of the steering column within the vehicle. In other words, a bearing unit is needed that resolves or at least mitigates the above-mentioned conflict.

A bearing unit of the type mentioned above is disclosed, in which a locking mechanism is provided that has a first eccentric for fixing a bearing sleeve on a bracket unit, wherein the locking mechanism is coupled to a first counterpart eccentric unit via a first form-fit connection acting in a first direction and a second form-fit connection acting in a second direction. The second direction is oriented in an opposite direction to the first direction. It should be noted that the designation of the eccentric as the "first" does not imply a number in the present case, but merely serves for simple explanation. The bearing sleeve is therefore locked in two oppositely oriented directions in each case via a form-fit connection. In one exemplary arrangement, the two directions correspond to adjustment directions of the bearing sleeve with respect to the bracket unit. The first and the second direction can thus both be oriented along the bearing sleeve center axis. Alternatively, it is also possible that the two directions are assigned to a height adjustment of the steering column and thereby run substantially vertically and transversely to the bearing sleeve center axis. In this context, a form-fit connection represents an exemplary reliable connection so that the steering column is reliably held in the vehicle even in accident situations, since the bearing unit is reliably and firmly locked on the bracket unit, In a released state of the aforementioned locking mechanism, the first form-fit connection and the second form-fit connection are canceled. The steering column can then be adjusted simply and smoothly in the first direction and the second direction.

The locking mechanism can also have a second eccentric, which is coupled to a second counterpart eccentric unit via a third form-fit connection acting in a third direction and a fourth form-fit connection acting in a fourth direction in order to fix the bearing sleeve on the bracket unit. In one exemplary arrangement, the third direction is oriented in the opposite direction to the fourth direction. In particular, the third direction and the fourth direction are oriented substantially perpendicular to the first direction and the second direction. It is understood, however, that the designation of the eccentric as the second again serves only for simple explanation. The second eccentric is also separate from the first eccentric. The bearing sleeve is therefore locked in the third direction and the fourth direction in each case via a form-fit connection. In one exemplary arrangement, these two directions also correspond to adjustment directions of the bearing sleeve with respect to the bracket unit. Thus, the third and fourth directions can both be oriented along the bearing sleeve center axis. It is also possible for the two directions to be associated with a height adjustment of the steering column and, in this context, to run substantially vertically and transversely to the bearing sleeve center axis. The first and second directions are then oriented in the other adjustment direction in each case. A form-fit connection again represents a particularly reliable connection, so that the steering column is locked reliably in all directions in the vehicle and is locked firmly on the bracket unit even in an accident situation.

The locking mechanism with the second eccentric can also be transferred to a released state in which the third form-fit connection and the fourth form-fit connection are canceled. The steering column can then be adjusted simply and smoothly in the third direction and the fourth direction.

According to one exemplary arrangement, the first direction and the second direction run predominantly vertically or completely vertically when the bearing unit is mounted on the vehicle, and the third direction and the fourth direction run substantially along the bearing sleeve center axis when the bearing unit is mounted on the vehicle. Alternatively, the first direction and the second direction run substantially along the bearing sleeve center axis when the bearing unit is mounted on the vehicle, and the third direction and the fourth direction run predominantly vertically or completely vertically when the bearing unit is mounted on the vehicle. A predominantly vertical course here means a course in a range of +/−30° about a vertical direction. In one exemplary arrangement, what is meant by a predominantly vertical course is a course with an angle of 25°, preferably +/−10° or +/−15°, to a vertical direction. Thus, the bearing unit makes it possible to realize, on the one hand, a height adjustment and, on the other hand, a longitudinal adjustment for a steering wheel coupled to the bearing unit. The bearing unit thus enables the position of the steering wheel to be flexibly adapted to a driver. Due to the total of four form-fit connections that can be formed and canceled as required, smooth and simple adjustability is combined with firm and reliable locking of the bearing unit on the bracket unit.

In one exemplary arrangement, at least one of the form-fit connections is self-reinforcing in its assigned direction of action. In yet another exemplary arrangement, all form-fit connections are self-reinforcing in their respectively associated direction of action. In this context, self-reinforcing means that the components forming the form-fit connection are acted upon in the direction of their form-fit coupling when a force is applied along the associated direction of action. This results in a particularly reliable locking due to the form-fitting.

According to one exemplary arrangement, in a view along the associated eccentric axis, each eccentric has substantially the shape of two combined quarter circle segments or two combined quarter ellipse segments. In this case, the circular arc sections of the quarter circle segments or the elliptical arc sections of the quarter ellipse segments are arranged diametrically opposite with respect to the eccentric axis. Furthermore, the sections of the eccentric which are comparatively far away from the eccentric axis always serve for the positive coupling. These are the elliptical arc sections or the circular arc sections. Such eccentrics have a simple structure and for this reason can be produced simply and cost-effectively. They also ensure reliable locking.

Each eccentric can be provided with a primary toothed section which, in order to fix the bearing sleeve on the bracket unit, engages with a form fit in an associated primary counterpart toothed section which is provided on the associated counterpart eccentric unit. In addition, each eccentric can be provided with a secondary toothed section which, in order to fix the bearing sleeve on the bracket unit, positively engages in an associated secondary counterpart toothed section which is provided on the associated counterpart eccentric unit. In other words, each form-fit connection is formed by the meshing of a toothed section with its associated counterpart toothed section. The result is reliable locking with a form fit. In addition, the toothed sections and counterpart toothed sections ensure that each eccentric can make a form-fit connection with the associated counterpart eccentric unit in numerous relative positions. The bearing sleeve can thus be locked on the bracket unit in fine steps. This results in a drivers ability to adjust the steering wheel in fine steps.

In one exemplary arrangement, the primary toothed section, the secondary toothed section, the primary counterpart toothed section and the secondary counterpart toothed section are advantageously sawtooth sections. In addition, at least one of the steeper tooth flanks of the primary toothed section rests against one of the steeper tooth flanks of the primary counterpart toothed section to make the associated form-fit connection, and at least one of the steeper tooth flanks of the secondary toothed section rests against one of the steeper tooth flanks of the secondary counterpart toothed section to make the associated form-fit connection. In this case a sawtooth section is understood to mean a toothed section which has teeth with a sawtooth profile. Such teeth each have a steep flank and a flat flank, wherein the steep flank is steeper than the flat flank. A self-reinforcing form-fit connection can be implemented in a simple and reliable manner by the sawtooth sections, in particular using the steep flanks. In particular, the flat flanks cause or enable a smooth relative movement of sawtooth sections associated with one another in a locked state, which allows flat flanks associated with one another to slide on one another and thus enables the self-reinforcing form-fit connection of the steep flanks that interact with each other in the locked state.

In one exemplary arrangement, the locking mechanism also has a clamping shaft and each eccentric is mounted radially on the clamping shaft and is rotatably coupled to the clamping shaft. In particular, each eccentric is rotatably coupled to the clamping shaft via a spring section. Each eccentric can thus be reliably transferred into a locked position and a released position via the clamping shaft. Tolerances resulting from production and assembly can be easily compensated for by the use of a spring for the rotary coupling. In addition, in this way it can be ensured that all desired form-fit connections are always generated. The engagement with a form fit is then held by a spring force resulting from the relevant spring section, in particular before the self-reinforcing form-fit connection begins.

In order to provide a predominantly vertical or completely vertical adjustability of the bearing sleeve relative to the bracket unit, the clamping shaft can pass through at least one first receiving slot that runs predominantly vertically or completely vertically when the bearing unit is mounted on the vehicle. In this case the first eccentric or the second eccentric is arranged in the region of the first receiving slot and the first counterpart eccentric unit or the second counterpart eccentric unit is provided in an edge region of the first receiving slot. In particular, the first receiving slot is provided on the bracket unit. Therefore, the vertical adjustment takes place by moving the clamping shaft together with the bearing unit along the first receiving slot. The bearing unit can be locked within the first receiving slot in all positions of the clamping shaft. This results in a simple adjustability, preferably with a comparatively wide adjustment range.

Alternatively or additionally, the clamping shaft passes through at least one second receiving slot in order to provide adjustability along the bearing sleeve center axis with respect to the bracket unit, wherein the at least one second receiving slot runs substantially along the bearing sleeve center axis when the bearing unit is mounted on the vehicle. In addition, the second eccentric or the first eccentric is arranged in the region of the second receiving slot and the second counterpart eccentric unit or the first counterpart eccentric unit is provided in an edge region of the second receiving slot. In particular, the second receiving slot is provided on the bearing sleeve. Thus, the longitudinal adjustment takes place in that the bearing sleeve is moved along the second receiving slot relative to the bracket unit and the clamping shaft. The bearing sleeve can be locked in any relative position of the clamping shaft within the second receiving slot. This also results in simple adjustability, in particular with a comparatively wide adjustment range.

In one variant, the locking mechanism has an actuating lever which is connected to the clamping shaft in a rotationally fixed manner, so that the locking mechanism can be transferred from a locked state to a released state and vice versa by pivoting the actuating lever. In particular, the clamping shaft in the released state also serves as a pivot axis about which the bearing sleeve can be pivoted relative to the bracket unit. The locking and releasing of the locking mechanism via an actuating lever is particularly simple and can be done in a short time.

The actuating lever can interact with at least one cam acting along a clamping shaft center axis of the clamping shaft, which cam cooperates with a counterpart cam surface provided on the actuating lever in such a way that the bearing sleeve in the locked state is clamped along the clamping shaft center axis on the bracket unit. In particular, the clamping causes the bearing sleeve to be secured against pivoting about the clamping shaft. The cam can be provided in one piece on the bracket unit or fastened thereto as a separate component.

BRIEF DESCRIPTION OF THE DRAWINGS

The disclosure is explained below with reference to an exemplary arrangement which is shown in the accompanying drawings. In the drawings.

DETAILED DESCRIPTION

Figure 1:
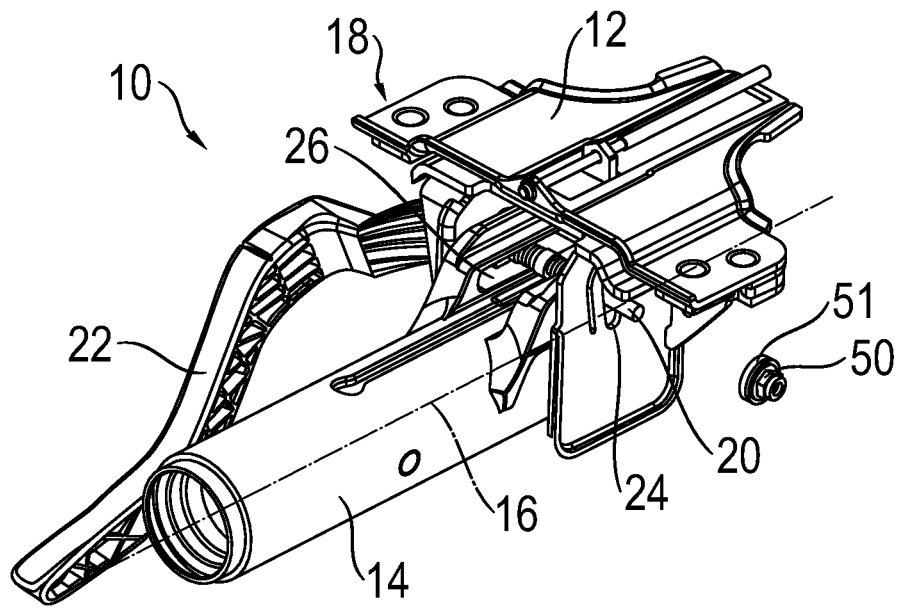
FIG. 1 shows a bearing unit according to an exemplary arrangement of the disclosure in a state in which it is mounted, except for a lock nut.

FIG. 1 shows a bearing unit 10 for fastening a steering column in a vehicle.

For this purpose, the bearing unit 10 comprises a bracket unit 12 which, in one exemplary arrangement, can be permanently mounted on the vehicle.

In addition, a bearing sleeve 14 is provided which extends along a bearing sleeve center axis 16. The bearing sleeve 14 is designed to receive a steering column. More precisely, a steering shaft can be supported within the bearing sleeve 14.

The bearing sleeve 14 is adjustable relative to the bracket unit 12, so that a steering wheel, not shown in detail, can be adapted to a driver with regard to its position within the vehicle.

For this purpose, a locking mechanism 18 is also provided, by which the bearing sleeve 14 can optionally be fixed on the bracket unit 12. This fixed state of the bearing sleeve 14 is referred to below as the locked state.

In addition, a relative movement of the bearing sleeve 14 with respect to the bracket unit 12 can optionally be released by the locking mechanism 18. This state is referred to below as the released state.

The locking mechanism 18 comprises a clamping shaft 20 and an actuating lever 22 connected to the clamping shaft 20 in a rotationally fixed manner.

The locking mechanism 18 can be transferred from the locked state to the released state and vice versa by pivoting the actuating lever 22.

In a state in which the bearing unit 10 is mounted on the vehicle, on the one hand the bearing sleeve 14 can be adjusted predominantly vertically or completely vertically relative to the bracket unit 12.

For this purpose, the clamping shaft 20 extends through two predominantly vertically or completely vertically extending, first receiving slots 24, which are provided on the bracket unit 12.

In the released state, the bearing sleeve 14 can therefore be adjusted relative to the bracket unit 12 by moving the clamping shaft 20 within the first receiving slots 24.

On the other hand, the bearing sleeve 14 can be adjusted relative to the bracket unit 12 along the bearing sleeve center axis 16. In a state in which the bearing unit 10 is mounted on the vehicle, this axis runs substantially horizontally.

For this purpose, the clamping shaft 20 extends through two second receiving slots 26, both of which run parallel to the bearing sleeve center axis 16.

The two second receiving slots 26 are arranged on the bearing sleeve 14.

In the released state, the bearing sleeve 14 can thus be displaced along the bearing sleeve center axis 16 with respect to the bracket unit 12 in that the clamping shaft 20 changes its position within the second receiving slots 26.

Figure 2:
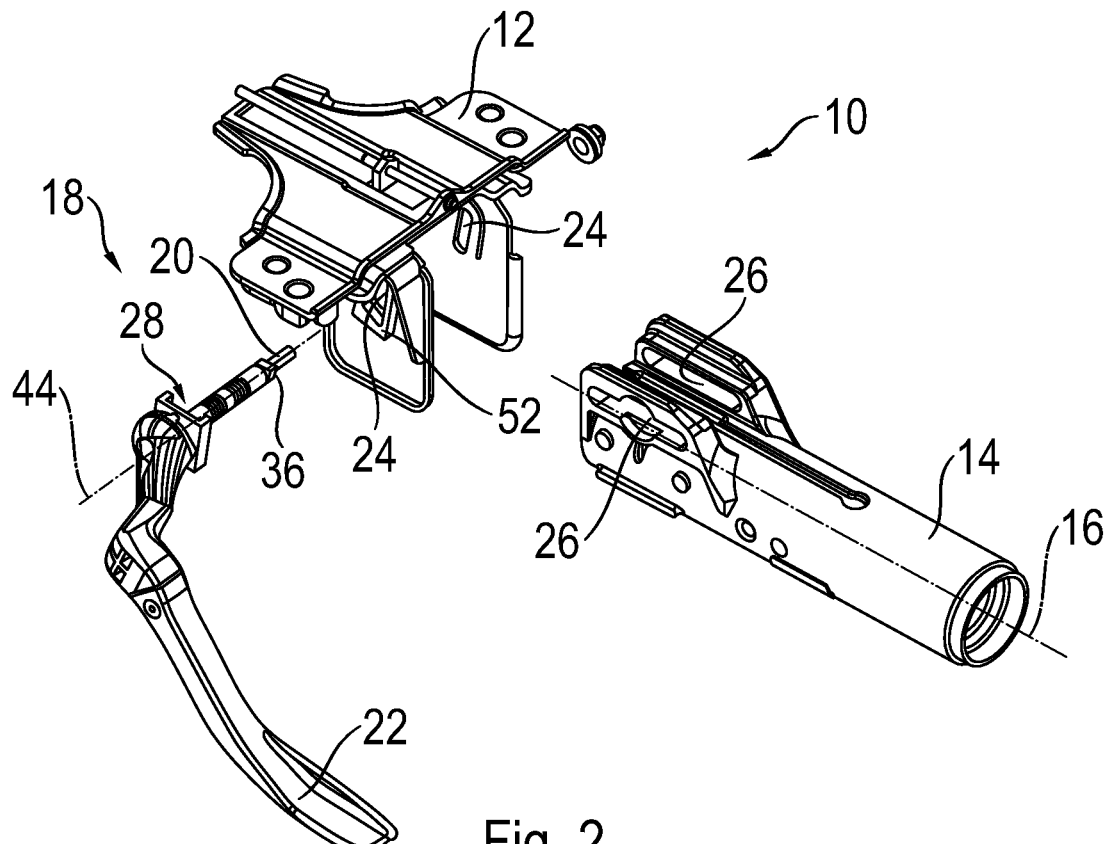
FIG. 2 shows the bearing unit from FIG. 1 in an exploded view.

In order to be able to reliably fix the bearing sleeve 14 to the bracket unit 12 in the locked state, the locking mechanism 18 has a first eccentric 28 which is mounted radially on the clamping shaft 20, see FIG. 2.

In addition, the first eccentric 28 is rotatably coupled to the clamping shaft 20.

Figure 4:
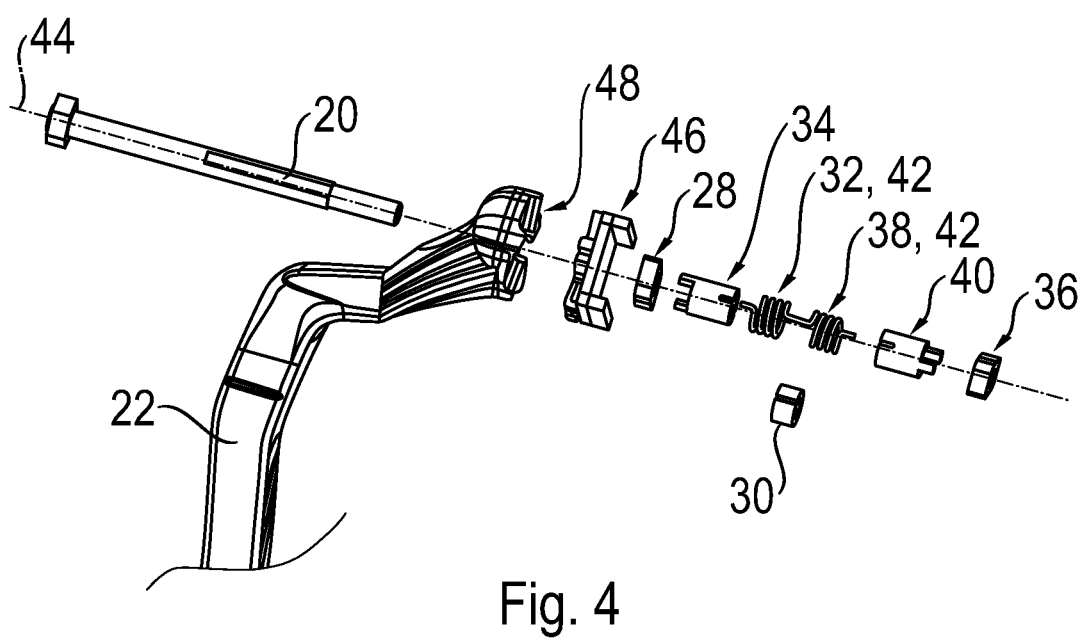
FIG. 4 is an exploded view of a detail of the bearing unit from FIGS. 1 to 3.

For this purpose, a driver 30 (see FIG. 4) is non-rotatably connected to the clamping shaft 20. The driver is rotatably coupled via a spring section 32 to a spacer 34, which in turn is rotatably coupled to the first eccentric 28.

Furthermore, a second eccentric 36 is provided, which is also mounted radially on the clamping shaft 20 and is rotatably coupled to the clamping shaft 20.

The driver 30, which is rotatably coupled to a second spacer 40 via a further spring section 38, which in turn is rotatably coupled to the second eccentric 36, is used to couple the second eccentric 36 in rotation.

In this context, the two spring sections 32, 38 can be designed as sections of a single spring 42.

The following sequence of the aforementioned components thus results along a clamping shaft center axis 44: First eccentric 28, first spacer 34, spring section 32, driver 30, spring section 38, second spacer 40, and second eccentric 36.

In addition, a cam 46 is positioned on the clamping shaft 20. Cam 46 interacts with a counterpart cam surface 48 on the actuating lever 22.

The counterpart cam surface 48 can be integrated into the actuating lever 22, or be provided as a separate component that is moved synchronously with the actuating lever 22.

Figure 3:
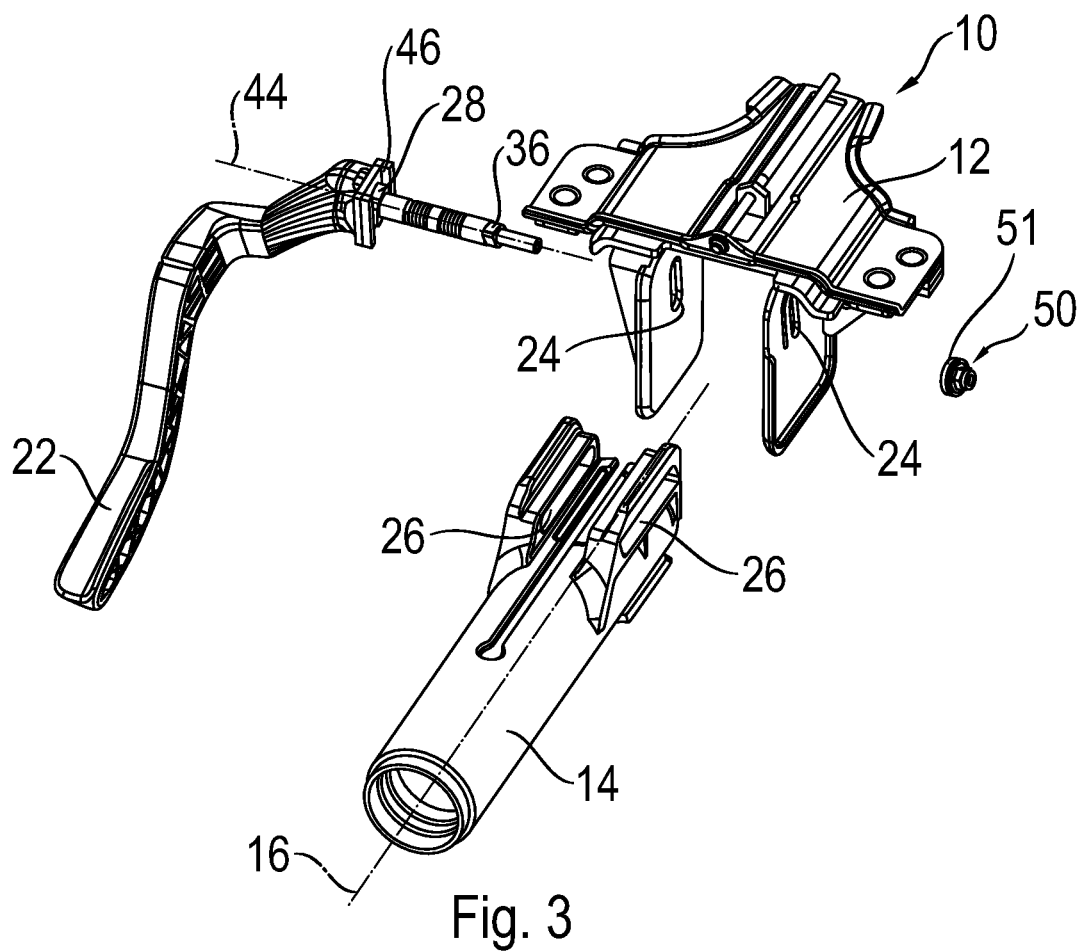
FIG. 3 shows the bearing unit from FIGS. 1 and 2 in an exploded view, with a different perspective compared to FIG. 2.

Furthermore, a lock nut 50 and an axial bearing 51 are provided (as shown in FIG. 3), which are positioned on an end of the clamping shaft 20 opposite the actuating lever 22.

By rotation of the actuating lever 22 with respect to the cam 46, a damping force is consequently generated, such that the bearing sleeve 14 can be damped on the bracket unit 12 along the damping shaft center axis 44.

The first eccentric 28 and the second eccentric 36 serve to secure the position of the bearing sleeve 14 on the bracket unit 12.

In the mounted state of the bearing unit 10, the first eccentric 28 is arranged in the region of one of the first receiving slots 24.

In addition, a first counterpart eccentric unit 52 interacting with the first eccentric 28 is positioned in an edge region of this first receiving slot 24, see FIG. 2.

In one exemplary arrangement, the first counterpart eccentric unit 52 is designed substantially as a frame which encloses the associated first receiving slot 24.

The second eccentric 86 is arranged in the region of one of the second receiving slots 26 and interacts at this point with a second counterpart eccentric unit 54, which in the exemplary arrangement, is shown as an edge of this second receiving slot 26. The second counterpart eccentric unit 54 is therefore provided in an edge region of the second receiving slot 26.

In the exemplary arrangement shown, the bearing unit 10 has two first receiving slots 24, which are each arranged on opposite sides of the bearing sleeve 14.

Two second receiving slots 26 are also provided, which are each positioned on opposite sides of the bearing sleeve center axis.

In each case a first receiving slot 24 is arranged adjacent to a second receiving slot 26 along the clamping shaft center axis 44. Adjacent receiving slots 24, 26 consequently form a receiving slot pair.

The first counterpart eccentric unit 52 and the second counterpart eccentric unit 54 are arranged on different receiving slot pairs.

Figure 5:
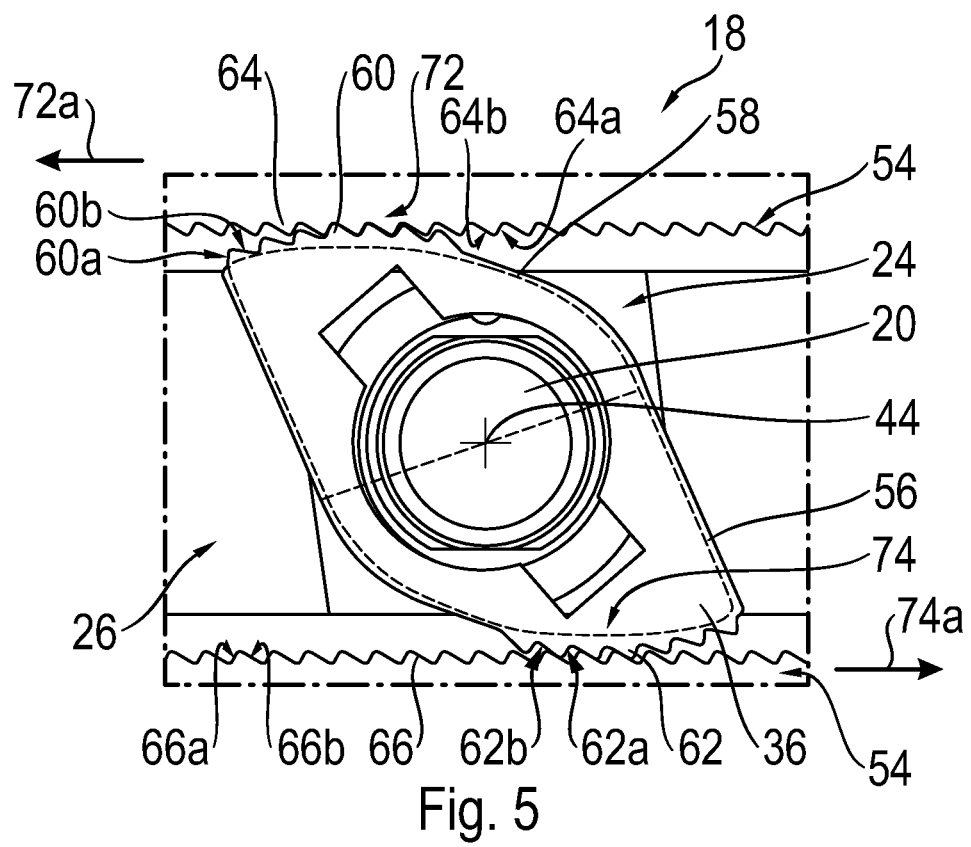
FIG. 5 is a detailed view to explain the mode of operation of the locking mechanism of the bearing unit from FIGS. 1 to 3.

In a view along the associated eccentric axis, which in the illustrated embodiment corresponds to the clamping shaft center axis 44, both the first eccentric 28 and also the second eccentric 36 have substantially the shape of two combined quarter ellipse segments 56, 58, which are only shown as an example for the second eccentric 36 (see FIG. 5).

The elliptical arc sections of the two quarter ellipse segments 56, 58 are arranged opposite one another with respect to the respective eccentric axis, i.e. with respect to the clamping shaft center axis 44.

The first eccentric 28 is designed in the same way.

Figure 6:
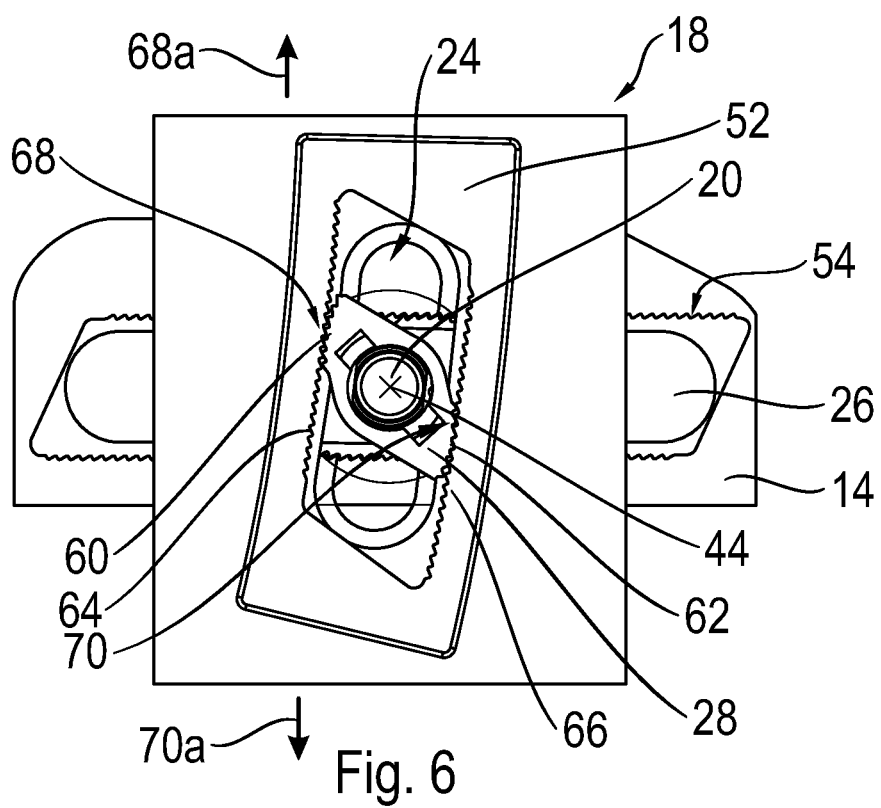
FIG. 6 is a further detailed view to explain the mode of operation of the locking mechanism of the bearing unit from FIGS. 1 to 3, and FIGS. 7 to 13 show a sequence for assembling the bearing unit from FIGS. 1 to 3.

Furthermore, each of the two eccentrics 28, 36 has a primary toothed section 60 and a secondary toothed section 62 (see FIGS. 5 and 6).

The primary toothed sections 60 and the secondary toothed sections 62 are each positioned on an elliptical arc section.

Each of the two primary toothed sections 60 interacts with a specific associated primary counterpart toothed section 64, which is provided in each case on the associated counterpart eccentric unit 52, 54.

The primary toothed section 60 of the first eccentric 28 thus interacts with the counterpart toothed section 64 on the first counterpart eccentric unit 52 and the primary toothed section 60 of the second eccentric 36 interacts with the primary counterpart toothed section 64 on the second counterpart eccentric unit 54, The secondary toothed sections 62 each interact with secondary counterpart toothed sections 66 which are arranged on the respectively assigned counterpart eccentric units 52, 54.

The secondary toothed section 62 of the first eccentric 28 thus interacts with the secondary counterpart toothed section 66 on the first counterpart eccentric unit 52 and the secondary toothed section 62 of the second eccentric 36 interacts with the secondary counterpart toothed section 66 on the second counterpart eccentric unit 54.

In one exemplary arrangement, the primary toothed sections 60, the secondary toothed sections 62, the primary counterpart toothed sections 64 and the secondary counterpart toothed sections 66 are designed as sawtooth sections. The respective toothings are thus formed from sawteeth.

The teeth of the primary toothed sections 60 each have a comparatively steeper tooth flank 60a, which can be referred to as a steep flank, and a comparatively flatter tooth flank 60b, which can be referred to as a flat flank. This is shown by way of example only for a single tooth of the second eccentric 36 (see FIG. 5).

In one exemplary arrangement, the same applies to the teeth of the secondary toothed sections 62, which have comparatively steeper tooth flanks 62a (steep flank) and comparatively flatter tooth flanks 62b (flat flank). This is also shown as an example only for a single tooth of the second eccentric 36 (see FIG. 5).

The associated primary and secondary counterpart toothed sections 64, 66 also have teeth with comparatively steeper tooth flanks 64a, 66a (steep flanks) and comparatively flatter tooth flanks 64b, 66b (flat flanks). This is also only shown as an example (see FIG. 5).

Toothed sections 60, 62 and counterpart toothed sections 64, 66 assigned to one another are each arranged in such a way that at least one of the steeper tooth flanks 60a, 62a of the toothed sections 60, 62 lies opposite one of the steeper tooth flanks 64a, 66a of the associated counterpart toothed sections 64, 66.

The same applies to the respective flatter tooth flanks 60b, 62b, 64b, 66b of the sawtooth sections.

In the locked position, the first eccentric 28 now forms a first form-fit connection 68 with the first counterpart eccentric unit 52, which acts in a first direction 68a which, in the embodiment shown, runs substantially vertically. For this purpose, the primary toothed section 60 engages positively in the primary counterpart toothed section 68.

Furthermore, the first eccentric 28 and the first counterpart eccentric unit form a second form-fit connection 70 which acts along a second direction 70a. The second direction 70a is also oriented substantially vertically, but opposite to the first direction 68a.

The second form-fit connection 70 is formed in that the secondary toothed section 62 of the first eccentric 28 engages with a form fit in the associated secondary counterpart toothed section 66 of the first counterpart eccentric unit 52.

The second eccentric 36 forms with the second counterpart eccentric unit 54 a third form-fit connection 72 which acts along a third direction 72a which runs substantially along the bearing sleeve center axis 16.

For this purpose, the primary toothed section 60 of the second eccentric 36 engages in a form-fitting manner in the primary counterpart toothed section 64 of the second counterpart eccentric unit 54.

In addition, the second eccentric 36 forms a fourth form-fit connection 74, which acts along a fourth direction 74a, in that the secondary toothed section 62 of the second eccentric 36 engages positively in the associated secondary counterpart toothed section 66 of the second counterpart eccentric unit 54.

The fourth direction 74a is also oriented substantially along the bearing sleeve center axis 16, but opposite to the third direction 72a.

The third direction 72a and the fourth direction 74a thus run substantially perpendicular to the first direction 68a and to the second direction 70a.

Due to the arrangement of the sawteeth already explained above, all form-fit connections 68, 70, 72, 74 are self-reinforcing. This means that when an individual form-fit connection 68, 70, 72, 74 is acted on, the associated teeth are pressed into one another along the associated direction of action 68a, 70a, 72a, 74a, The bearing unit 10 can be assembled as follo First, the actuating lever 22, the cam 46, the first eccentric 28, the first spacer 34, the spring 42, the driver 30, the second spacer 40 and the second eccentric 36 are mounted on the clamping shaft 20 by fitting all of these components onto the clamping shaft 20 along the clamping shaft center axis 44. The lock nut 50 is not yet fitted (see FIG. 4).

This results in a clamping shaft assembly 76.

This assembly is then pushed through the first receiving slot 24, wherein the second eccentric 36 is oriented such that it extends substantially along the first receiving slot 24.

Figure 7:
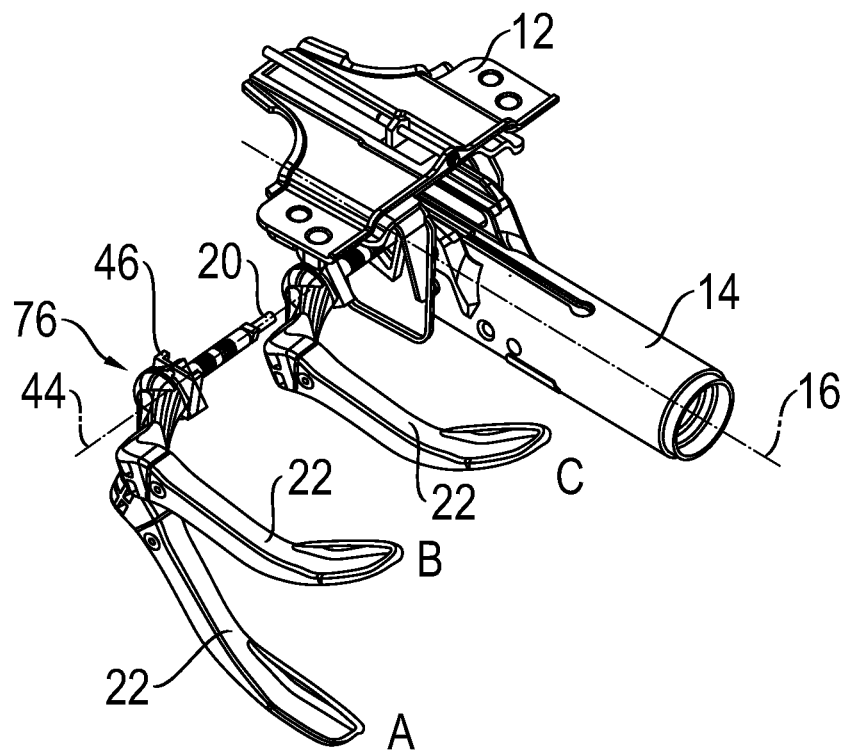

For this purpose, the damping shaft assembly 76 is rotated starting from a position A corresponding to its installation position into a position B (see FIG. 7).

Figure 9:
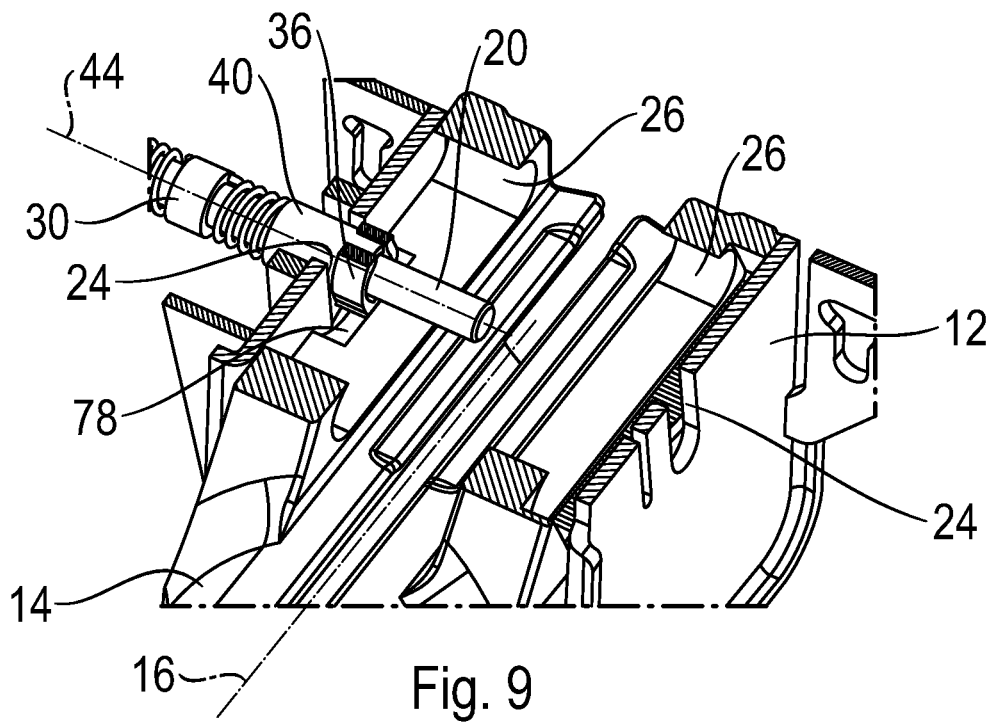

In this rotational position, the second eccentric 36 can be pushed through the first receiving slot 24 and thus arrives in a receiving pocket 78 which is provided on the bearing sleeve 14 (See FIG. 9).

Figure 8:
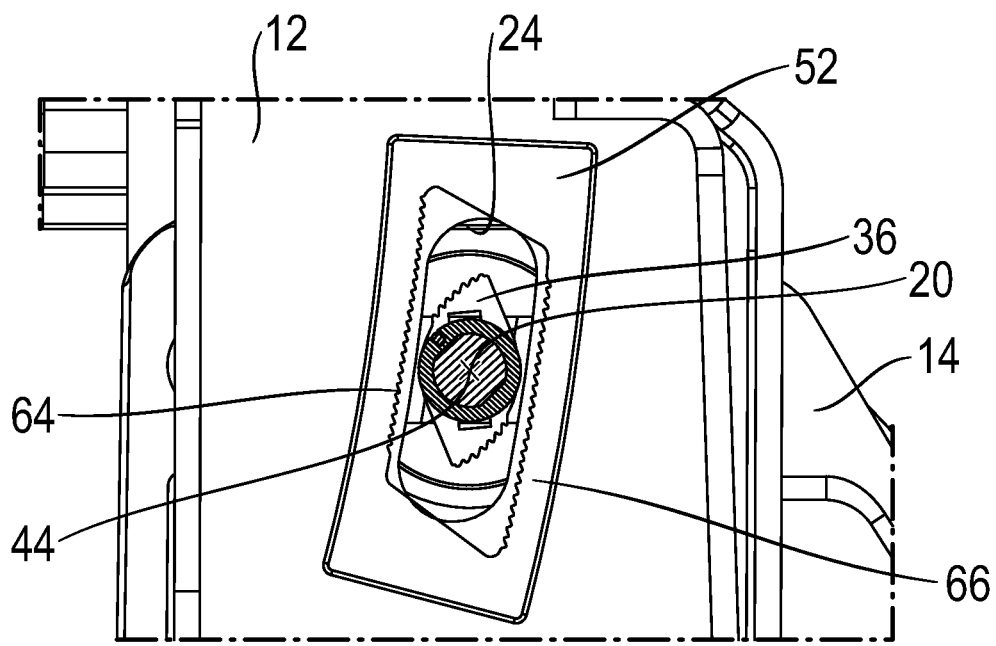

The clamping shaft assembly 76 is thus displaced into a position C (see FIGS. 7 to 9).

Figure 10:
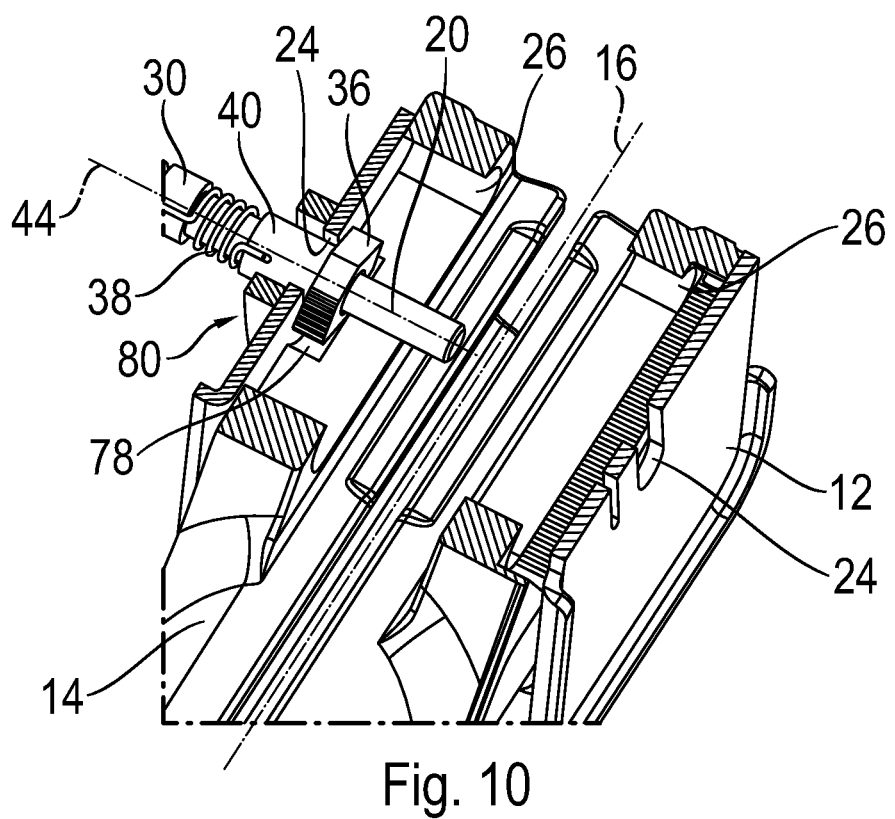

The clamping shaft assembly 76 is then rotated by substantially 90°, so that the second eccentric 36 is oriented transversely to the course of the first receiving slot 24. At the same time, the second eccentric 36 then runs substantially along the bearing sleeve center axis 16 (see FIG. 10).

Figure 11:
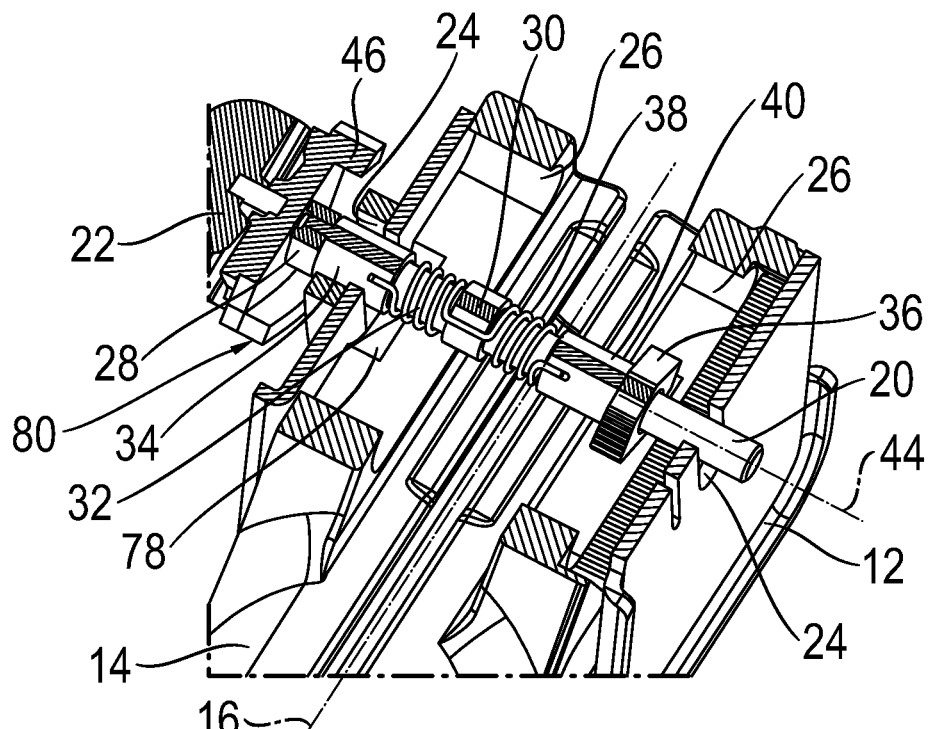

The clamping shaft assembly 76 can now be pushed further into the bearing sleeve 14 along the clamping shaft center axis 44 until the second eccentric 36 arrives in the region of a second receiving slot 26 (see FIG. 11).

The cam 46 must now be aligned with respect to the bracket unit 12 in such a way that it can engage in an anti-rotation device 80 provided on the bracket unit 12.

Figure 12:
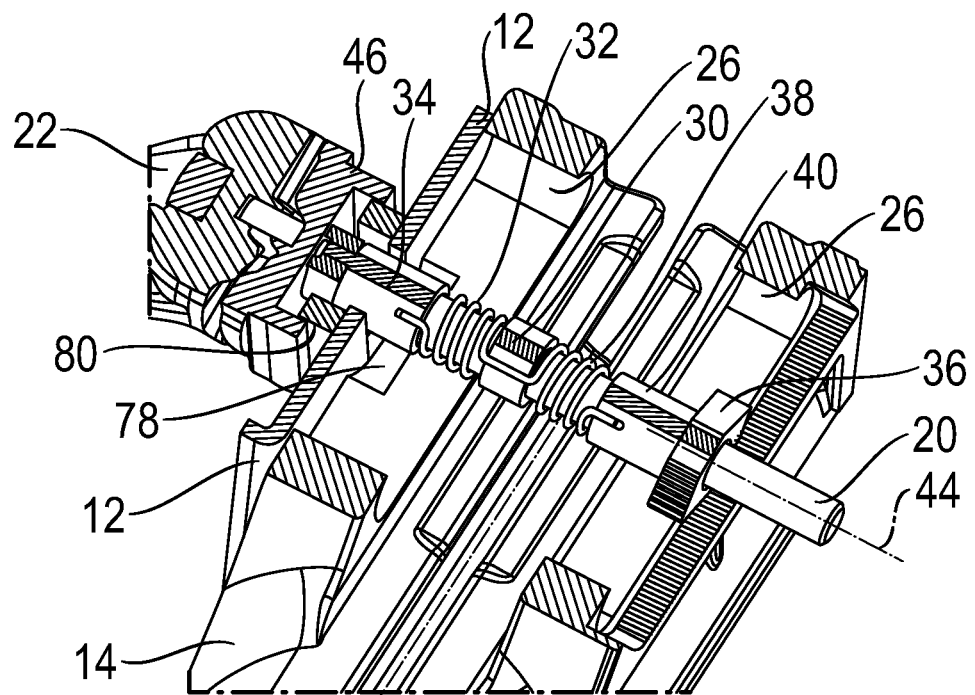

The clamping shaft assembly 76 can then be pushed along the clamping shaft center axis 44 to its end positions (see FIG. 12).

Figure 13:
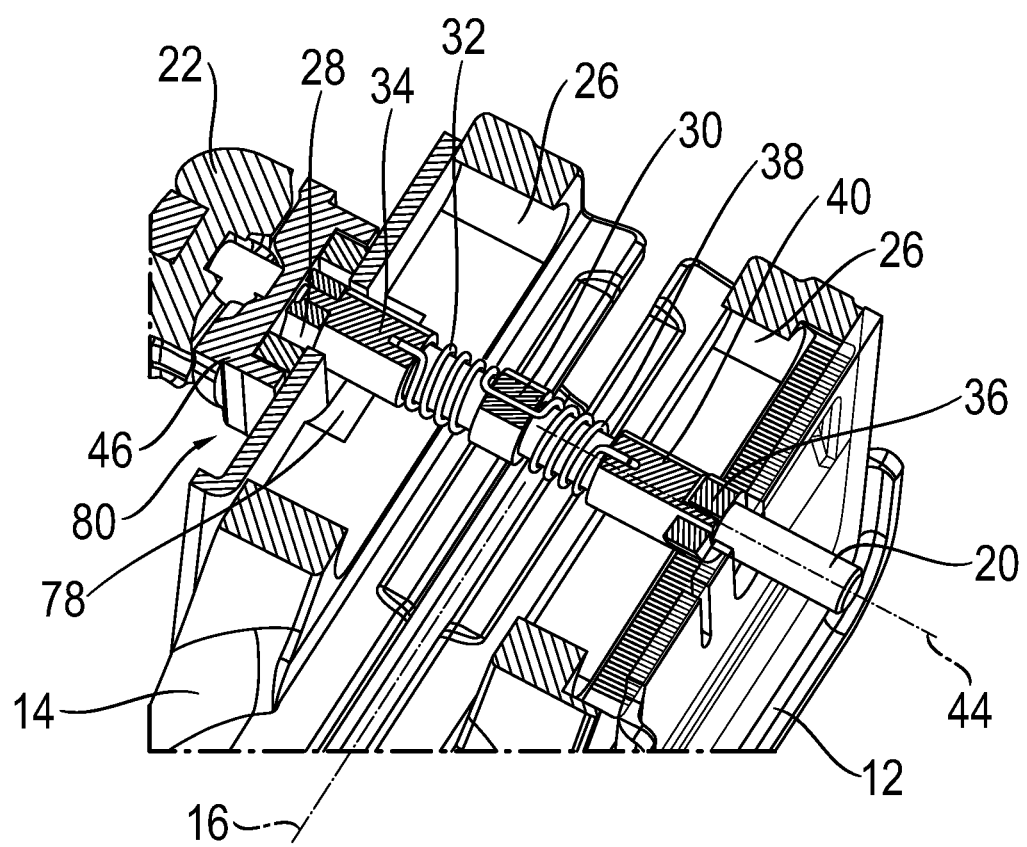

The clamping shaft assembly 76 is then rotated in such a way that both the first eccentric 28 and the second eccentric 36 come into engagement with the associated counterpart eccentric units 52, 54 (see FIG. 13). This engagement takes place under spring loading, which results from the spring sections 32, 38.

Finally, the lock nut 50 and the axial bearing 51 are mounted on the end of the clamping shaft 20 which is opposite the actuating lever 22.

The invention claimed is:

1. A bearing unit for fastening a steering column in a vehicle, with a bracket unit that can be fixed to the vehicle, comprising: a bearing sleeve which extends along a bearing sleeve center axis and is designed to receive the steering column, and a locking mechanism for optionally fixing the bearing sleeve on the bracket unit and for optionally releasing a relative movement of the bearing sleeve with respect to the bracket unit, wherein the locking mechanism has first and second eccentrics for fixing the bearing sleeve on the bracket unit, wherein the first eccentric has a first form-fit connection acting in a first direction and a second form-fit connection acting in a second direction is coupled to a first counterpart eccentric unit, wherein the second direction is oriented in the opposite direction to the first direction; and wherein the second eccentric is coupled to a second counterpart eccentric unit via a third form-fit connection acting in a third direction and a fourth form-fit connection acting in a fourth direction, wherein the third direction is oriented in the opposite direction to the fourth direction; and wherein a first spring section is connected to the first eccentric and a second spring section is connected to the second eccentric, and wherein the first and second spring sections are connected together.

2. The bearing unit according to claim 1 wherein, when the bearing unit is mounted on the vehicle, the first direction and the second direction run predominantly vertically or completely vertically and, when the bearing unit is mounted on the vehicle, the third direction and the fourth direction run substantially along the bearing sleeve center axis.

3. The bearing unit according to claim 1, wherein at least one of the form-fit connections is self-reinforcing in its associated direction of action.

4. The bearing unit according to claim 1, wherein in a view along an associated eccentric axis, each eccentric has substantially the shape of two combined quarter circle segments or two combined quarter ellipse segments, wherein the circular arc sections of the quarter circle segments or the elliptical arc sections of the quarter ellipse segments are arranged diametrically opposite with respect to the eccentric axis.

5. Bearing unit according to claim 1, wherein each eccentric is provided with a primary toothed section for fixing the bearing sleeve on the bracket unit, and each eccentric is positively engaged in an associated primary counterpart toothed section, which is provided on the associated counterpart eccentric unit, and that each eccentric is provided with a secondary toothed section which, in order to fix the bearing sleeve on the bracket unit, engages with a form fit in an associated secondary counterpart toothed section-which is provided on the associated counterpart eccentric unit.

6. The bearing unit according to claim 5, wherein the primary toothed section, the secondary toothed section, the primary counterpart toothed section and the secondary counterpart toothed section are sawtooth sections and at least one of a set of steeper tooth flanks of the primary toothed section rests against one of a set of steeper tooth flanks of the primary counterpart toothed section to make the associated form-fit connection, and at least one of a set of steeper tooth flanks of the secondary toothed section rests against one of a set of steeper tooth flanks of the secondary counterpart toothed section to make the associated form-fit connection.

7. The bearing unit according to claim 1, wherein the locking mechanism has a clamping shaft and each eccentric is mounted radially on the clamping shaft and is rotatably coupled to the clamping shaft.

8. The bearing unit according to claim 7, wherein to provide a predominantly vertical or completely vertical adjustability of the bearing sleeve relative to the bracket unit, the clamping shaft can pass through at least one first receiving slot that runs predominantly vertically or completely vertically when the bearing unit is mounted on the vehicle, wherein the first eccentric or the second eccentric is arranged in the region of the first receiving slot and the first counterpart eccentric unit or the second counterpart eccentric unit is provided in an edge region of the first receiving slot.

9. The bearing unit according to claim 8, wherein to provide adjustability along the bearing sleeve center axis with respect to the bracket unit, the clamping shaft passes through at least one second receiving slot, wherein the at least one second receiving slot runs substantially along the bearing sleeve center axis when the bearing unit is mounted on the vehicle, and wherein the second eccentric or the first eccentric is arranged in the region of the second receiving slot and the second counterpart eccentric unit or the first counterpart eccentric unit is provided in an edge region of the second receiving slot.

10. The bearing unit according to claim 9, wherein the second receiving slot is provided on the bearing sleeve.

11. The bearing unit according to claim 1, wherein the third direction and the fourth direction are oriented substantially perpendicular to the first direction and to the second direction.

12. The bearing unit according to claim 1, wherein when the bearing unit is mounted on the vehicle, the first direction and the second direction run substantially along the bearing sleeve center axis and, when the bearing unit is mounted on the vehicle, the third direction and the fourth direction run predominantly vertically or completely vertically.

13. The bearing unit according to claim 1, wherein all form-fit connections are self-reinforcing in each case in their associated direction of action.

14. The bearing unit according to claim 1, wherein a first spacer is rotatably coupled to the first eccentric and wherein a second spacer is rotatably connected to the second eccentric and wherein the first and second spacers are connected together by the first and second spring sections.

15. A bearing unit for fastening a steering column in a vehicle, with a bracket unit that can be fixed to the vehicle, comprising:
- a bearing sleeve which extends along a bearing sleeve center axis and is designed to receive the steering column, and
- a locking mechanism for optionally fixing the bearing sleeve on the bracket unit and for optionally releasing a relative movement of the bearing sleeve with respect to the bracket unit,
- wherein the locking mechanism has a first eccentric for fixing the bearing sleeve on the bracket unit,
- wherein the first eccentric has a first form-fit connection acting in a first direction and a second form-fit connection acting in a second direction is coupled to a first counterpart eccentric unit, and wherein the second direction is oriented in the opposite direction to the first direction;
- wherein the locking mechanism has a second eccentric for fixing the bearing sleeve on the bracket unit, wherein the second eccentric is coupled to a second counterpart eccentric unit via a third form-fit connection acting in a third direction and a fourth form-fit connection acting in a fourth direction, wherein the third direction is oriented in the opposite direction to the fourth direction;
- wherein the locking mechanism has a clamping shaft and each eccentric is mounted radially on the clamping shaft and is rotatably coupled to the clamping shaft;
- wherein each eccentric is rotatably coupled to the clamping shaft via a spring section; and
- wherein there are two spring section coupled together between each eccentric.

16. The bearing unit according to claim 15, wherein a driver is positioned between the two spring sections.

17. A bearing unit for fastening a steering column in a vehicle, with a bracket unit that can be fixed to the vehicle, comprising:
- a bearing sleeve which extends along a bearing sleeve center axis and is designed to receive the steering column, and
- a locking mechanism for optionally fixing the bearing sleeve on the bracket unit and for optionally releasing a relative movement of the bearing sleeve with respect to the bracket unit,
- wherein the locking mechanism has a first eccentric for fixing the bearing sleeve on the bracket unit,
- wherein the first eccentric has a first form-fit connection acting in a first direction and a second form-fit connection acting in a second direction is coupled to a first counterpart eccentric unit, and
- wherein the second direction is oriented in the opposite direction to the first direction;
- wherein the locking mechanism has a second eccentric for fixing the bearing sleeve on the bracket unit, wherein the second eccentric is coupled to a second counterpart eccentric unit via a third form-fit connection acting in a third direction and a fourth form-fit connection acting in a fourth direction, wherein the third direction is oriented in the opposite direction to the fourth direction;
- wherein the locking mechanism has a clamping shaft and each eccentric is mounted radially on the clamping shaft and is rotatably coupled to the clamping shaft;
- wherein the locking mechanism has an actuating lever which is non-rotatably connected to the clamping shaft so that the locking mechanism can be transferred from a locked state to a released state and vice versa by pivoting of the actuating lever.

18. The bearing unit according to claim 17, wherein the actuating lever interacts with at least one cam acting along a clamping shaft center axis of the clamping shaft, the cam cooperates with a counterpart cam surface provided on the actuating lever or designed as a separate component in such a way that the bearing sleeve is clamped in the locked state along the clamping shaft center axis on the bracket unit.

* * * * *